US012770057B2

(12) United States Patent
Yogaraj et al.

(10) Patent No.: US 12,770,057 B2
(45) Date of Patent: Oct. 20, 2026

(54) FUTUREPROOFING A MACHINE LEARNING MODEL

(71) Applicant: INTERNATIONAL BUSINESS MACHINES CORPORATION, Armonk, NY (US)

(72) Inventors: Kavitha Hassan Yogaraj, Bangalore (IN); Frederik Frank Flother, Schhlieren (CH); Vladimir Rastunkov, Mundelein, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 934 days.

(21) Appl. No.: 18/048,658

(22) Filed: Oct. 21, 2022

(65) Prior Publication Data

US 2024/0135242 A1 Apr. 25, 2024
US 2024/0232690 A9 Jul. 11, 2024

(51) Int. Cl.
*G06N 20/00* (2019.01)
*G06N 3/042* (2023.01)
*G06N 3/126* (2023.01)

(52) U.S. Cl.
CPC ............. *G06N 20/00* (2019.01); *G06N 3/042* (2023.01); *G06N 3/126* (2013.01)

(58) Field of Classification Search
CPC ......... G06N 20/00; G06N 3/042; G06N 3/126
See application file for complete search history.

(56) References Cited

U.S. PATENT DOCUMENTS 6,941,287 B1 * 9/2005 Vaidyanathan ........ G06N 3/126 706/14
2017/0330109 A1 11/2017 Maughan
2018/0082209 A1 * 3/2018 Thompson ............. G06N 3/126
2020/0311557 A1 * 10/2020 Jin ....................... G06V 10/454
2021/0133621 A1 5/2021 Ravizza
2021/0166252 A1 6/2021 Krowitz
2021/0264287 A1 * 8/2021 Gardner ............... G06N 3/0895
(Continued)

FOREIGN PATENT DOCUMENTS

GB 2597352 A * 1/2022 ............. G06N 3/042
WO 2019002603 A1 1/2019

OTHER PUBLICATIONS

Xiaoyu You, Mi Zhang, Daizong Ding, Fuli Feng, and Yuanmin Huang. 2021. Learning to Learn the Future: Modeling Concept Drifts in Time Series Prediction. In Proceedings of the 30th ACM International Conference on Information, Knowledge Management (CIKM '21). https://doi.org/10.1145/3459637.3482271 (Year: 2021).*
(Continued)

*Primary Examiner* — James T Tsai
(74) *Attorney, Agent, or Firm* — CHIP LAW GROUP

(57) ABSTRACT

Provided are a computer-implemented method, a system, and a computer program product for futureproofing a machine learning model, in which historical data for updates and changes to a baseline machine learning model are received. A futureproofing metric is generated. An enhanced machine learning model comprising a futureproofed version of the baseline machine learning model is generated with the historical data and the baseline machine learning model as inputs.

20 Claims, 11 Drawing Sheets

(56) References Cited

U.S. PATENT DOCUMENTS

| | | | | |
|---|---|---|---|---|
| 2022/0043681 | A1* | 2/2022 | Moharrer | G06N 20/00 |
| 2022/0237903 | A1* | 7/2022 | Johnson | G06N 3/126 |

OTHER PUBLICATIONS

Žliobaitė, I. (2010). Learning under concept drift: an overview. arXiv preprint arXiv:1010.4784. (Year: 2010).*
B. Sniezyski, et al., "Combining Rule Induction and Reinforcement Learning", 2011, 6pp., [online] http://www.sfb637.uni-bremen.de/pubdb/repository/SFB637-B4-10-003-IC.pdf.
L. Baier, et al., "Handling Concept Drift for Predictions in Business Process Mining", IEEE, 2020, 8pp., [online] https://arxiv.org/pdf/2005.05810.pdf.
S. Seo, et al., "Controlling Neural Networks with Rule Representations", 35th Conference on Neural Information Processing Systems (NeurIPS 2021), Sydney, Australia, 2021, 16pp., [online] https://arxiv.org/pdf/2106.07804.pdf.
"ML Metadata: Version Control for ML", blog.tensorflow.org, 4pp., [online][retrieved Jul. 13, 2022] https://blog.tensorflow.org/2021/01/ml-metadata-version-control-for-ml.html.
"Can you build a machine learning model to monitor another model?", evidentlyai.com, 2pp., [online][retrieved Jul. 13, 2022] https://evidentlyai.com/blog/can-you-build-a-model-to-monitor-a-model).
"Version Control for Machine Learning", Keepsake.ai., 5pp., [online][retrieved Oct. 12, 2022] https://keepsake.ai/.
"Database and Expert Systems Applications", Springer Link, 17th International Conference, DEXA 2006, Sep. 2006, 6pp., [online][retrieved Oct. 12, 2022] https://link.springer.com/content/pdf/10.1007/11827405.pdf#page=653.
S. Das, "Best Practices for Dealing with Concept Drift", neptune.ai., Jul. 21, 2022, 7pp., [online][retrieved Oct. 12, 2022] https://neptune.ai/blog/concept-drift-best-practices).
S. Oladele, "A Comprehensive Guide to Monitor your Models in Production", neptune.ai, Aug. 11, 2022, 25pp., [online][retrieved Oct. 12, 2022] https://neptune.ai/blog/how-to-monitor-your-models-in-production-guide.
J. Czakon, ML Metadata Store: What It Is, Why It Matters, and How to Implement It, neptune.ai, 31pp., [online][retrieved Jul. 13, 2022] https://neptune.ai/blog/ml-metadata-store.
Angelov, "Making AI models more robust more efficiently—Towards Data Science", towardsdatascience.com, 10pp., [online][retrieved Jul. 13, 2022] https://towardsdatascience.com/making-models-more-robust-more-efficiently-e8737178452c.
A. Gonfalonieri, "Why Machine Learning Models Degrade in Production", Jul. 2019, 9pp., [online][retrieved Jul. 13, 2022] https://towardsdatascience.com/why-machine-learning-models-degrade-in-production-d0f2108e9214.
M. Schmitt, "MLOps for machine learning model decay", datarevenue.com, 6pp., [online][retrieved Jul. 13, 2022] https://www.datarevenue.com/en-blog/mlops-for-model-decay.
"How to Deploy and Future-Proof Your Models", explorium.ai, 2pp., [online][retrieved Jul. 13, 2022] https://www.explorium.ai/resource/how-to-deploy-and-future-proof-your-models-from-theory-to-production/.
B. Sniezyski, et al., "B2R: An Algorithm for Converting Bayesian Networks to Sets of Rules", Conference Paper, Jan. 2010, 16pp., [online] https://www.researchgate.net/profile/Bartlomiej-Sniezynski/publication/221464269_B2R_An_Algorithm_for_Converting_Bayesian_Networks_to_Sets_of_Rules/links/54368a700cf2bf1f1f2bdafc/B2R-An-Algorithm-for-Converting-Bayesian-Networks-to-Sets-of-Rules.pdf.
B. Sniezyski, et al., "Converting a Naive Bayes Models with Multi-valued Domains into Sets of Rules", DEXA 2006, LNCS 4080, pp. 634-643, 2006, [online] https://www.researchgate.net/profile/Bartlomiej-Sniezynski/publication/262222080_Converting_a_Naive_Bayes_Models_with_Multi-valued_Domains_into_Sets_of_Rules/links/00b4952af0a96ed65a000000/Converting-a-Naive-Bayes-Models-with-Multi-valued-Domains-into-Sets-of-Rules.
S.H. Kim et al., "Machine Learning-Based Surrogate Modeling for Data-Driven Optimization:A Comparison of Subset Selection for Regression Techniques", 2019, Georgia Institute of Technology School of Chemical & Biomolecular Engineering, 32pp.

* cited by examiner

FUTUREPROOFING A MACHINE LEARNING MODEL

BACKGROUND

1. Field

Embodiments relate to a method, system, and computer program product for the futureproofing of a machine learning model.

2. Background

A machine learning model is a mathematical model that is used to predict outcomes from data. The machine learning model is trained on a dataset, where the dataset is a collection of data that includes both the input data (such as features) and the output data (such as labels). The machine learning model is then able to generate predictions on new data that has not been seen before.

For example, a machine learning model for computer vision may be able to identify cars and pedestrians in a real-time video. Another example may be a machine learning model for natural language processing that may be able to translate words and sentences. Data scientists have created whole families of machine learning models for many different uses. Many such machine learning models have been implemented in neural networks.

Machine learning may be described in many ways including as a type of optimization. Optimization problems deal with finding the best, or "optimal" solution to some type of problem. In order to find the optimal solution, a way of measuring the quality of a solution is needed. This is done via what is known as an objective function. This objective function, taking data and model parameters as arguments, may be evaluated to return a number. A solution that employs machine learning may include some parameters that may be changed, and such solutions may be used to find values for these parameters that either maximize or minimize the number returned by the objective function.

SUMMARY OF THE PREFERRED EMBODIMENTS

Provided are a computer-implemented method, a system, and a computer program product for futureproofing a machine learning model, in which historical data for updates and changes to a baseline machine learning model are received. A futureproofing metric is generated. An enhanced machine learning model comprising a futureproofed version of the baseline machine learning model is generated with the historical data and the baseline machine learning model as inputs.

In additional embodiments, a future use and performance of the futureproofed version of the baseline machine learning model are captured and analyzed after deployment for a predetermined period of time, to iteratively improve at least one of: the futureproofed version of the baseline machine learning model; and operations performed for generating the futureproofed version of the baseline machine learning model.

In yet additional embodiments, prior to receiving the historical data, in response to determining that the baseline machine learning model is not yet available for use, the baseline machine learning model is trained with suitable data.

In certain embodiments, the historical data includes additional updates and additional changes for related models to the machine learning model that have occurred prior to the baseline machine learning model being used.

In further embodiments, the historical data includes training data that had been used to previously build related models to the baseline machine learning model.

In additional embodiments, the generating of the futureproofed version of the machine learning model takes place via operations that implement an evolutionary algorithm.

In further embodiments, the generating of the futureproofed version of the machine learning model takes place via operations that implement a time-series algorithm.

In yet further embodiments, the generating of the futureproofed version of the machine learning model is based on factors that include future concept drifts, covariate shifts, and prior probability shifts.

In certain embodiments, the futureproofed version of the machine learning model is neurosymbolic and differs from the baseline machine learning model by inclusion of rules. The enforcement of different rules is initiated at different points in time.

In certain embodiments, the machine learning model is a supervised model.

In further embodiments, the futureproofed version of the baseline machine learning model is generated while avoiding retraining of the baseline machine learning model.

In additional embodiments, the machine learning model is extrapolated for generating the futureproofed version of the machine learning model.

BRIEF DESCRIPTION OF THE DRAWINGS

Referring now to the drawings in which like reference numbers represent corresponding parts throughout.

DETAILED DESCRIPTION

Figure 1:
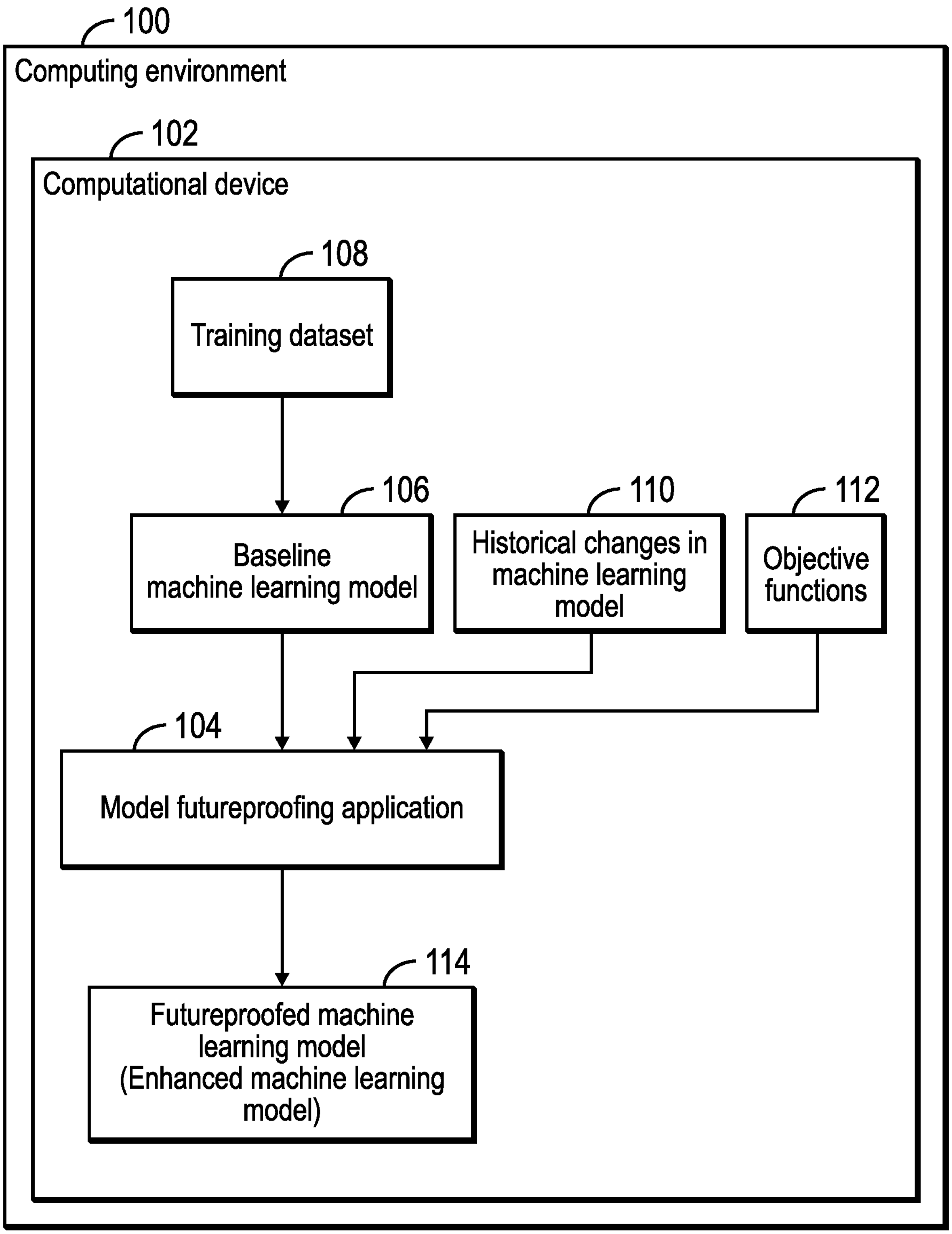
FIG. 1 illustrates a block diagram of a computing environment for generating a futureproofed version of a machine learning model, in accordance with certain embodiments.

In the following description, reference is made to the accompanying drawings which form a part hereof and which illustrate several embodiments. It is understood that other embodiments may be utilized and structural and operational changes may be made.

Machine learning models are being increasingly adopted across industries. However, very often these models deteriorate relatively soon after deployment. There are a number of changes that may represent the root case for such model decay. These changes include:

(a) Covariate shift that corresponds to shift in the independent variables;

(b) Prior probability shift that corresponds to shift in the target variable; and (c) Concept drift that corresponds to shift in the relationship between the independent and the target variables.

One common approach to address model decay has been to monitor the performance of a model. When the model has deteriorated beyond a certain threshold, the model is updated or replaced, typically by retraining with a newer dataset. This approach has a range of problems. For example, trying to achieve automation by monitoring machine learning models with another "watchdog" model often does not work. Moreover, monitoring and retraining a model continually may take a significant amount of added processing time and programmer resources. Additional infrastructure and processes to continually collect, curate, and store data may also be needed. Furthermore, a careful selection the data that should actually be used for retraining may also be required.

Certain embodiments are provided to avoid having to monitor and retrain machine learning models after deployment, by futureproofing the machine learning models prior to deployment, and thus preventing or at least delaying model decay. As a result, improvements are made to the operations of computing devices that employ machine learning.

Certain embodiments provide mechanisms for futureproofing a machine learning model by building an evolution of the model based on historical data, for improving the operations of computing devices that employ machine learning.

Certain embodiments provide mechanisms for futureproofing a machine model by building an evolution of the model based on historical data about how models may have changed in the past. This improves the operations of computing devices that employ machine learning.

Certain embodiments adapt a dualistic framework where neural networks or machine learning models are combined with rules as used in machine learning. This allows certain embodiments to have two modes by which the embodiments may tune the performance of a machine learning model, the two modes being related to the training and the rules.

The rules may include reasoning heuristics, equations, associative logic, constraints, and expert opinions. Certain embodiments use supervised training to create a baseline model and use time-dependent rules, learned from evolutionary algorithms in order to adjust the function of the machine learning model and thus futureproof the machine learning model. Evolutionary algorithms are a collective of machine learning techniques inspired on the concept of evolution and such techniques allow separation of model performance evaluation from solution searching.

The rules are derived from the output models of the evolutionary algorithm. Deriving rules from a model is possible via existing machine learning mechanisms. In another embodiment, representative test cases are run through models generated by the evolutionary algorithm dataset in order to derive the rules statistically. Certain embodiments try to maximize the utility of a machine learning model over its lifecycle and to maximize the length of that lifecycle, without having to retrain the machine learning model. However, in the dualistic framework, if manual changes to the model are still necessary after deployment, certain embodiments allow the rules to be manually adapted and thus allow at least some form of intervention without a new machine learning training.

In certain embodiments, the utility may be defined in different ways. For instance, the utility may be comprised of the time-averaged maximum with respect to a set of metrics (e.g., accuracy and fairness); the utility may also include constraints such that metrics never fall below a certain threshold at any point over the projected lifecycle of the machine learning model.

Certain embodiments provide operations that implement an evolutionary algorithm that takes three inputs: (a) Historical changes in models; (b) Training dataset and baseline model; (c) Objective functions, capacity, and constraints.

Certain embodiments predict covariate shifts, prior probability shifts, and concept drifts. Based on these factors, certain embodiments directly create mutated or futureproofed machine learning models directly. These two parallel approaches may compete with each other based on the objective function, where the objective function is the expected utility, and where the focus is on first generating unseen data before training new models.

Certain embodiments take care of model management in the cycle of generating a futureproofed machine learning model, by keeping track of metadata and the differences with a baseline model. Machine learning model metadata is increasingly being collected and stored, including previous versions of a given model. Certain embodiments assume that there is no access to the historical evolution of the training data and perhaps only the latest snapshot is available. Of course, if certain embodiments did have access to the historical training data, then the embodiments could also use this information for futureproofing.

The above discussion focused on futureproofing the machine learning models by including rules that start getting enforced at different points in time. More generally, the future evolution of a machine learning model may of course be incorporated into the machine learning model in different ways.

In certain additional embodiments, if a set of models that forms a basis is available, then a futureproofed machine learning model may also be built by combining the models in that set with different relative weights.

Exemplary Embodiments

FIG. 1 illustrates a block diagram of FIG. 1 illustrates a block diagram of a computing environment 100 for generating a futureproofed version of a machine learning model, in accordance with certain embodiments.

A computational device 102 is included in the computing environment 100. The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102 may be an element in any suitable network, such as, a storage area network, a wide area network, the Internet, an intranet, etc. In certain embodiments, the computational device 102 may be a node in a cloud computing environment.

A model futureproofing application 104 executes in the computational device 102. In certain embodiments, the model futureproofing application 104 may be implemented in software, hardware, firmware, or any combination thereof.

The model futureproofing application 104 takes as an input a baseline machine learning model 106 that may have already been trained with a training dataset 108. The term "baseline" as used in the element "baseline machine learning model" 106 is indicative of the fact that the model futureproofing application 104 starts with the baseline machine learning model 106 while generating a futureproofed machine learning model 114. The model futureproofing application 104 also takes historical changes in machine learning model (shown via reference numeral 110) and objective functions (shown via reference numeral 112) as inputs.

The model futureproofing application 104 generates the futureproofed machine learning model 114, based on inputs comprising the baseline machine learning model 106, the historical changes in the machine learning model 110, and the objective functions 112.

Therefore, FIG. 1 illustrates a computing environment 100 in which a model futureproofing application 104 generates a futureproofed machine learning model 114 from a baseline machine learning model 106.

Figure 2:
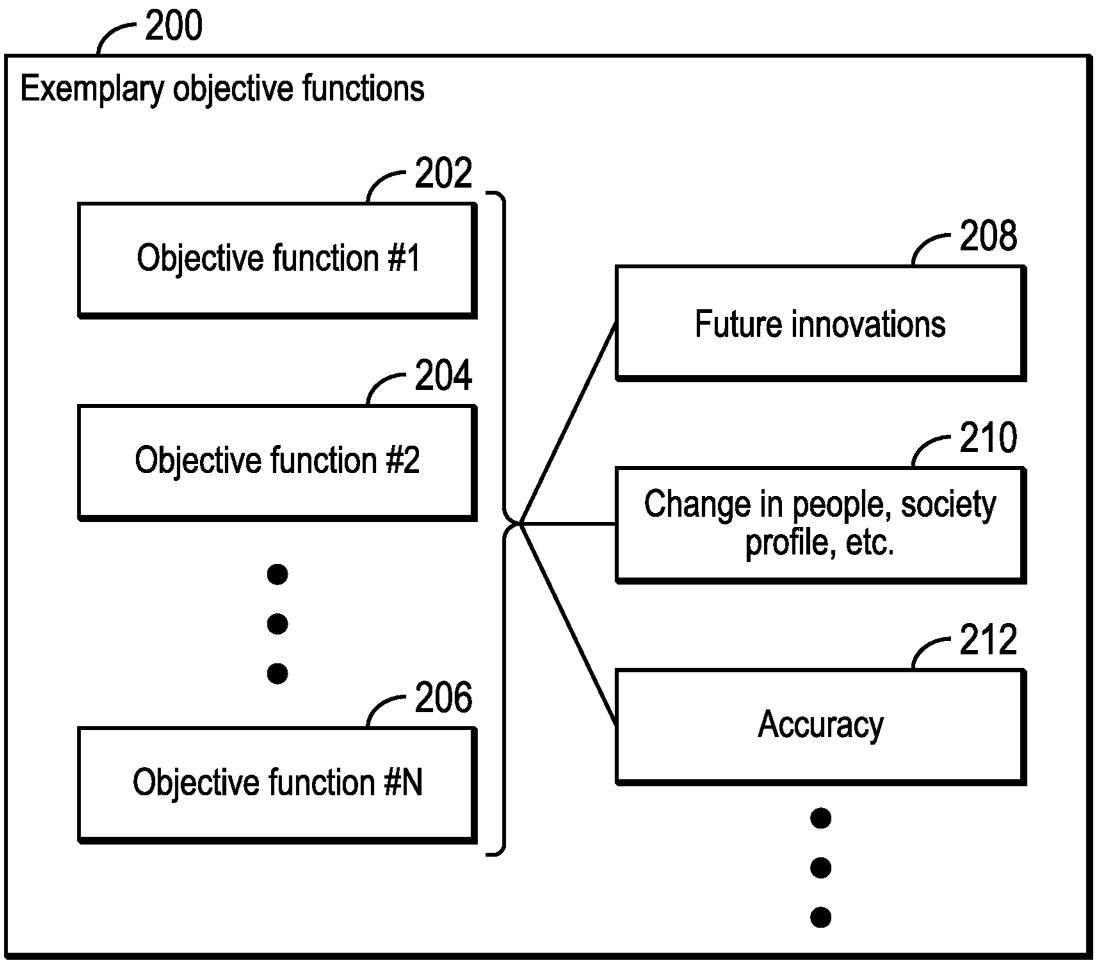
FIG. 2 illustrates a block diagram that shows exemplary objective functions, in accordance with certain embodiments.

FIG. 2 illustrates a block diagram 200 that shows exemplary objective functions, in accordance with certain embodiments. A plurality of objective function 202, 204, 206 may comprise functions that take into account future innovations 208, changes in people and society profile, etc. (shown via reference numeral 210), accuracy 212, and so on. It should be noted that many other objective functions that takes into account future events may be used in certain embodiments.

Figure 3:
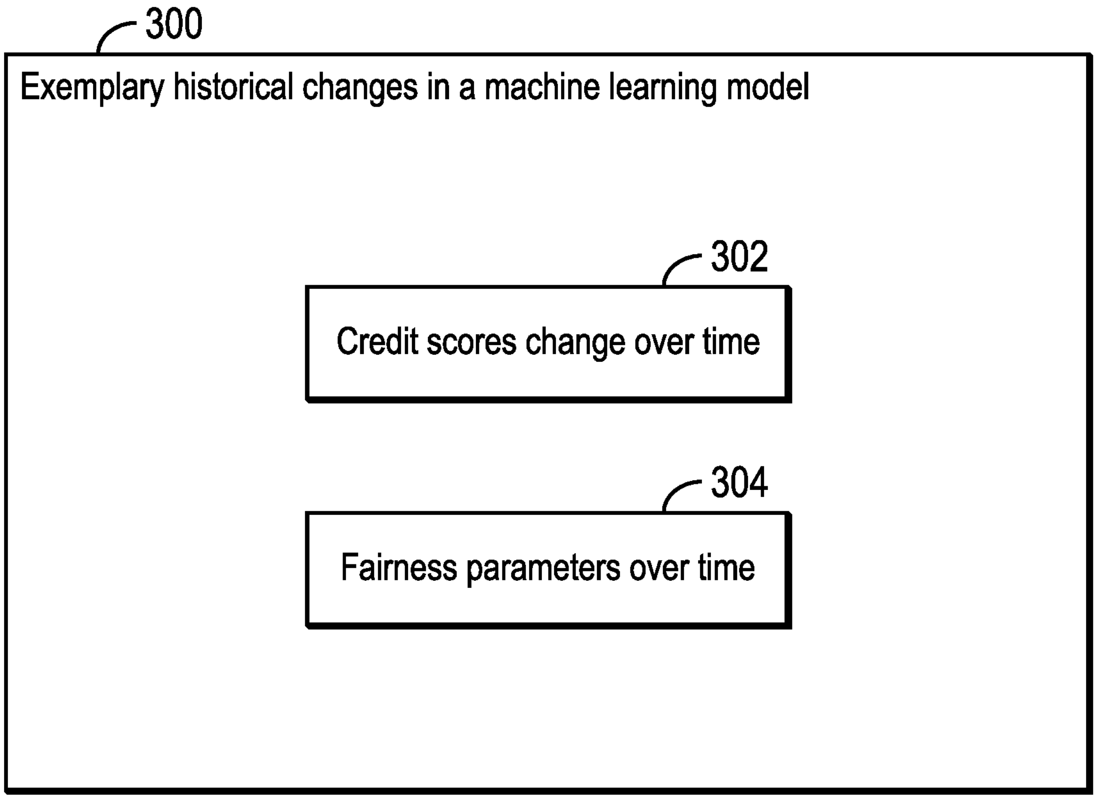
FIG. 3 illustrates a block diagram that shows exemplary historical changes in a machine learning model, in accordance with certain embodiments.

FIG. 3 illustrates a block diagram 300 that shows exemplary historical changes in a machine learning model, in accordance with certain embodiments. Exemplary historical changes shown in FIG. 3 may include credit score changes over time for lending (shown via reference numeral 302), and change in fairness parameters over time (shown via reference 304). It should be noted that there are many such historical changes in a machine learning model that may be provided as inputs to the model futureproofing application 104.

Figure 4:
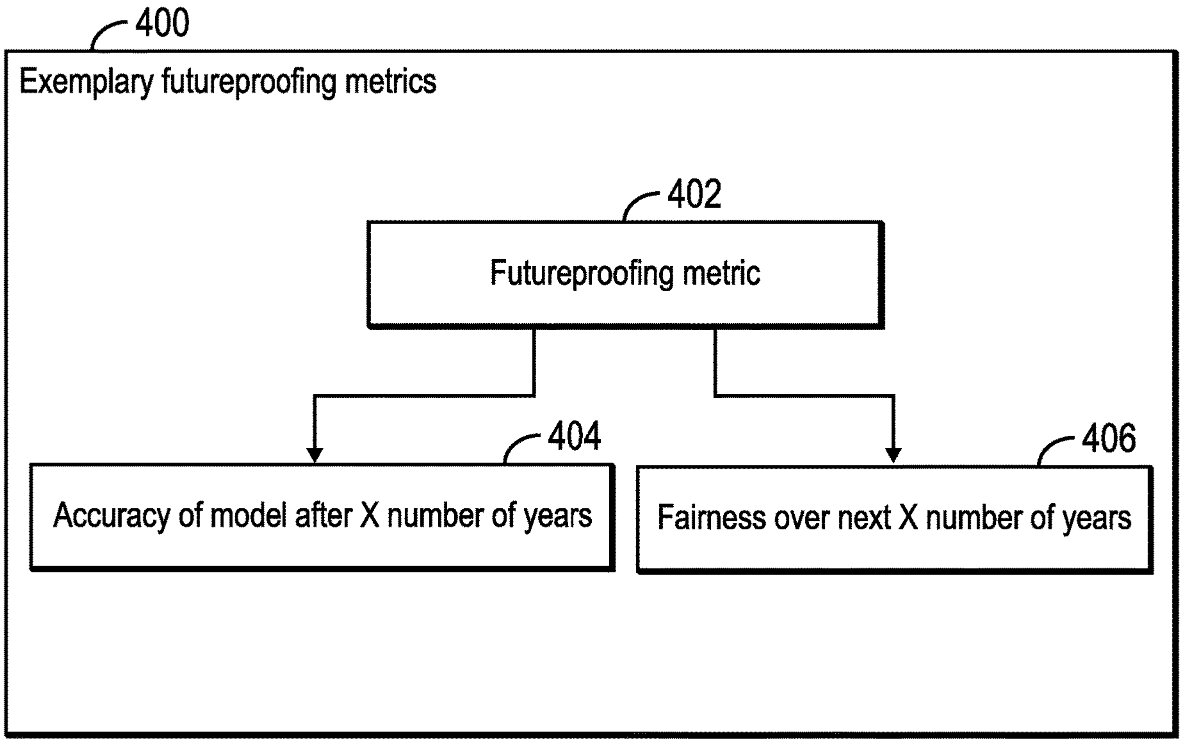
FIG. 4 illustrates a block diagram that shows exemplary futureproofing metrics, in accordance with certain embodiments.

FIG. 4 illustrates a block diagram 400 that shows exemplary futureproofing metrics 402, in accordance with certain embodiments. Exemplary futureproofing metrics 402 may include the accuracy of the machine learning model after a certain number of years (shown via reference numeral 404), and fairness characteristics of the machine learning model over a certain number of years in the future (as shown via reference numeral 406). Other futureproofing metrics 402 that may improve a machine learning model for future use may be employed in alternative embodiments.

Figure 5:
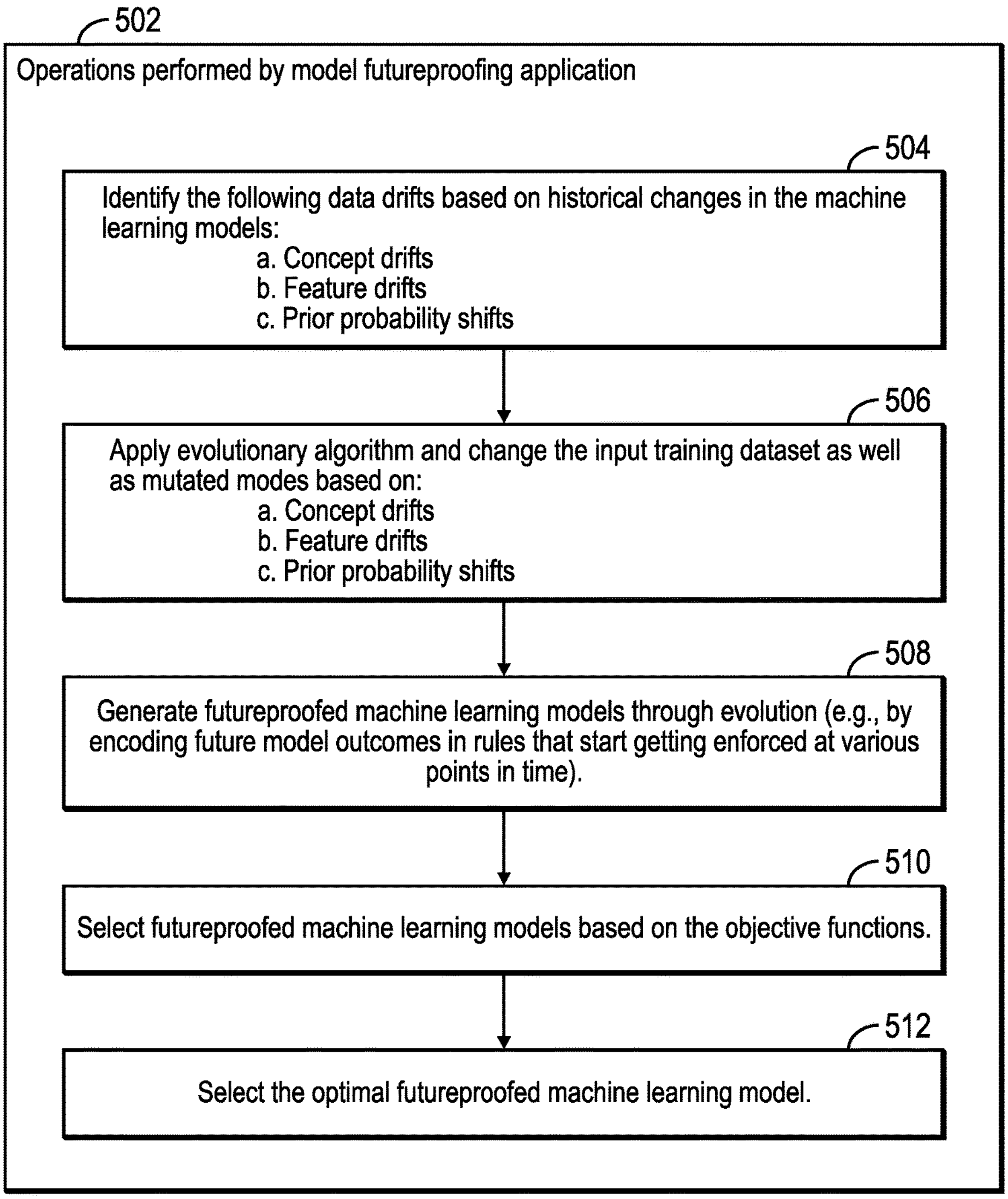
FIG. 5 illustrates a flowchart that shows operations performed by a model futureproofing application, in accordance with certain embodiments.

FIG. 5 illustrates a flowchart 502 that shows operations performed by a model futureproofing application 104 that executes in the computational device 102, in accordance with certain embodiments.

Control starts at block 504 in which the process identifies the following data drifts based on historical changes in the machine learning models: (a) concept drifts; (b) feature drifts; and (c) prior probability shifts.

From block 504 control proceeds to block 506 in which an evolutionary algorithm is applied, and the input training dataset and mutated modes are changed based on (a) concept drifts; (b) feature drifts; and (c) prior probability shifts.

From block 506 control proceeds to block 508 in which the model futureproofing application 104 generates futureproofed machine learning models through evolution. In certain embodiments, the futureproofed machine learning models may be generated by encoding future model outcomes in rules that start getting enforced at various points in time.

From block 508 control proceeds to block 510 in which futureproofed machine learning models are selected based on the objective functions, and then the optimal futureproofed machine learning model is selected (at block 512).

Figure 6:
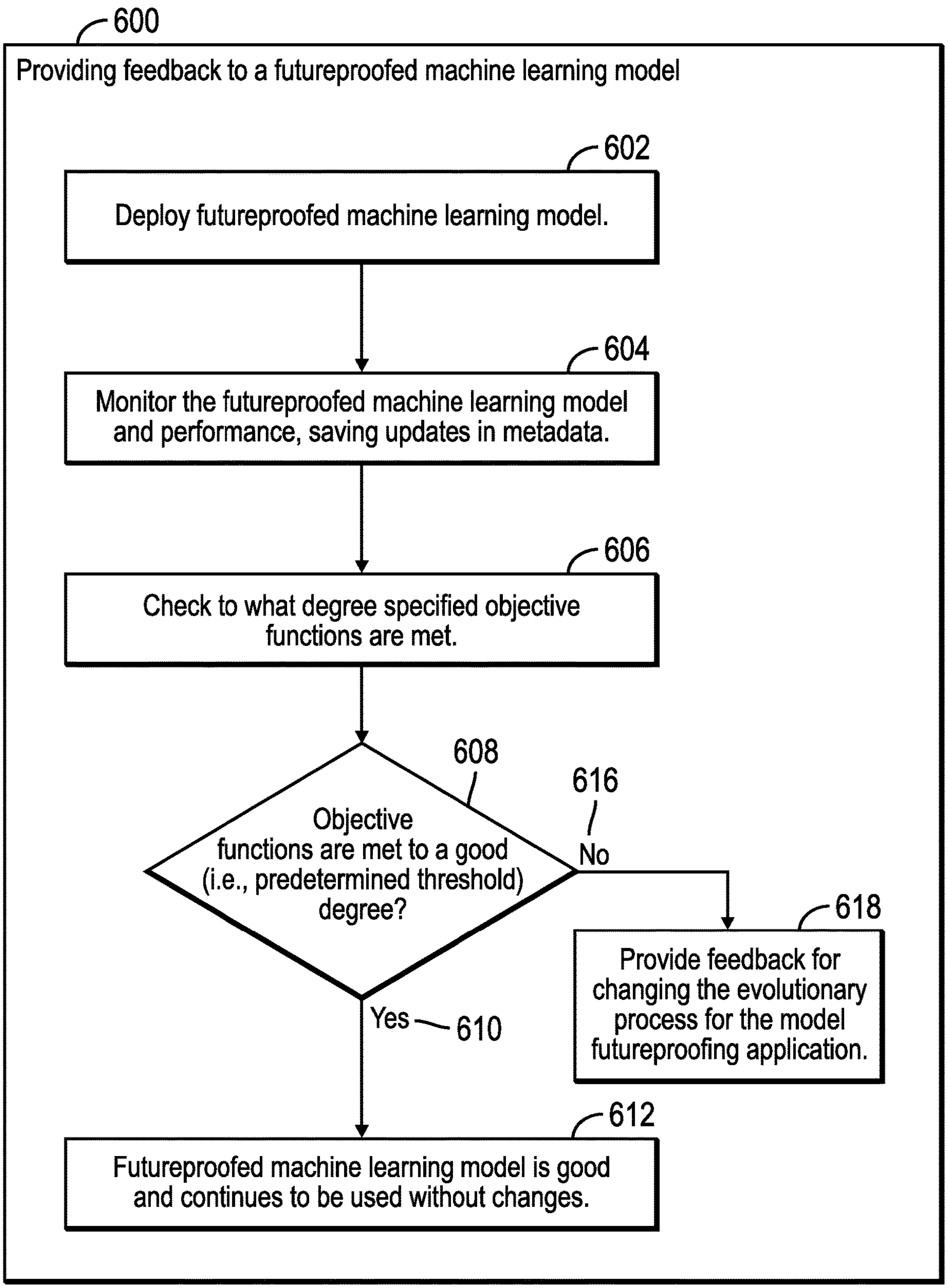
FIG. 6 illustrates a flowchart that shows how feedback is provided to a futureproofed machine learning model, in accordance with certain embodiments.

FIG. 6 illustrates a flowchart 600 that shows how feedback is provided to a futureproofed machine learning model 114, in accordance with certain embodiments. The operations shown in flowchart 600 may be performed by the model futureproofing application 104 that executes in the computational device 102.

Control starts at block 602 in which a futureproofed machine learning model is deployed. Control proceeds to block 604 in which the futureproofed machine learning model is monitored, and the performance of the futureproofed machine learning model is also monitored, while saving the updates in metadata. A computation is performed (at block 606) to check as to what degree the specified objective functions are met.

From block 606 control proceeds to block 608 in which a determination is made as to whether the objective functions are satisfied to a good (i.e., to a predetermined threshold) degree. If so ("Yes" branch 610), then the futureproofed machine learning model is good and continues to be used without changes (at block 612). If not ("No" branch 616), then feedback is provided for changing the evolutionary process for the model futureproofing application 104 (at block 618).

Figure 7:
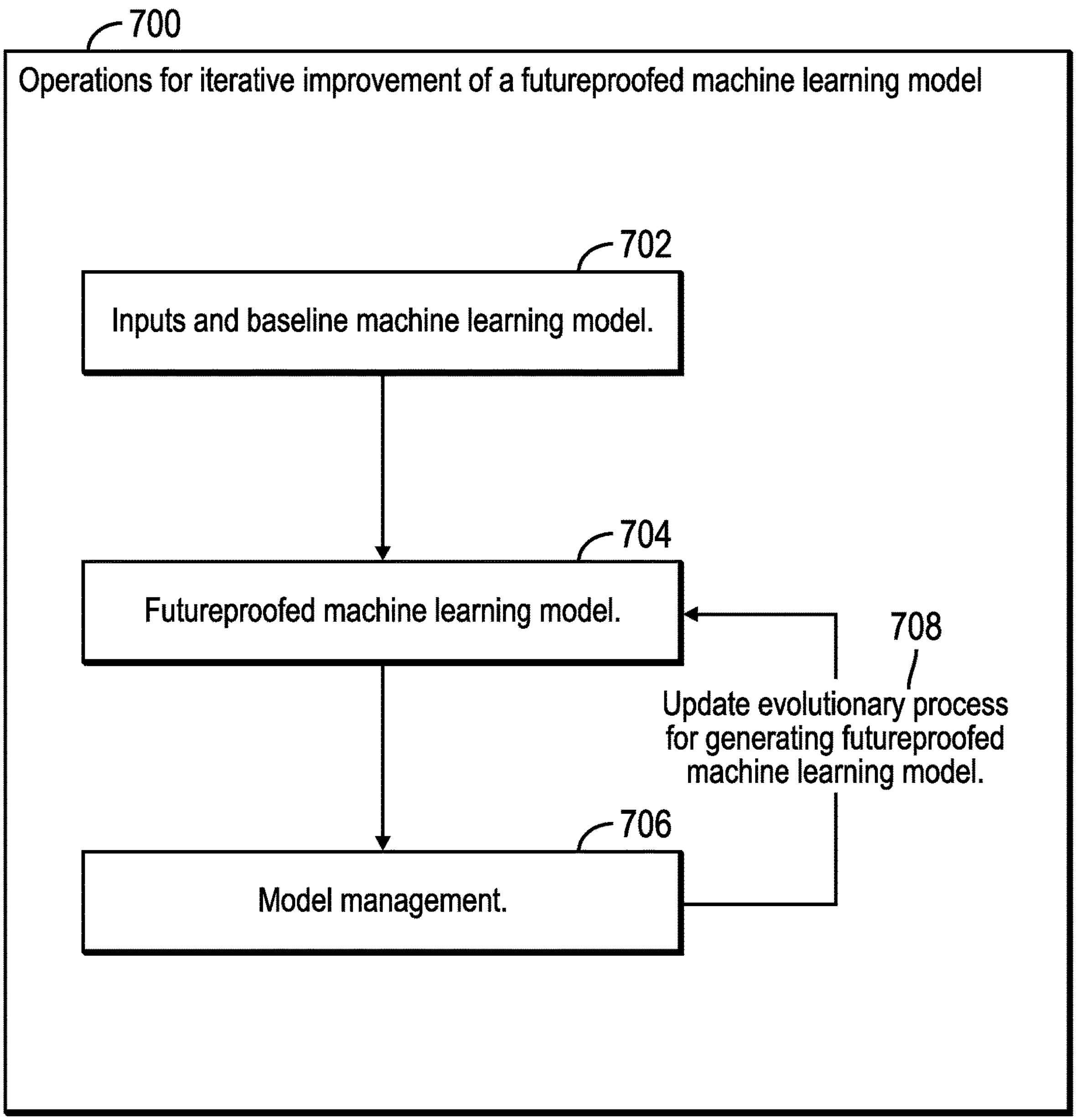
FIG. 7 illustrates a flowchart that shows operations for iterative improvement of a futureproofed machine learning model, in accordance with certain embodiments.

FIG. 7 illustrates a flowchart 700 that shows operations for iterative improvement of a futureproofed machine learning model, in accordance with certain embodiments.

Control starts at block 702 where inputs and a baseline machine learning model are provided in order to generate (at block 704) a futureproofed machine learning model. Control proceeds to block 706 where model management is performed to update the evolutionary process for the futureproofed machine learning model (as shown via reference numeral 708).

Figure 8:
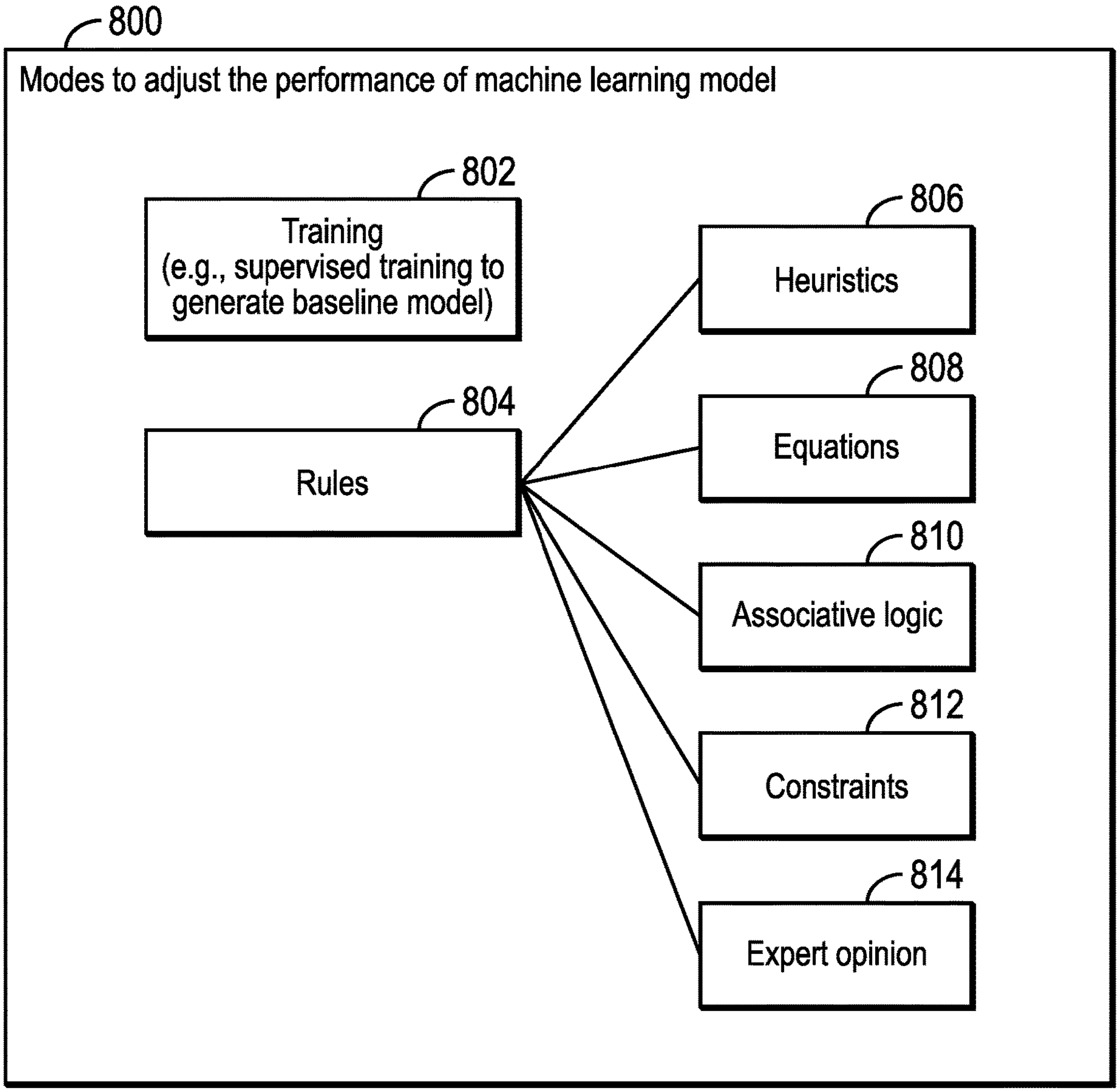
FIG. 8 illustrates a block diagram that shows modes to adjust the performance of a machine learning model in accordance with certain embodiments.

FIG. 8 illustrates a block diagram 800 that shows modes to adjust the performance of a machine learning model in accordance with certain embodiments.

The training 802 for generating the baseline model may be supervised training and the rules 804 may include heuristics 806, equations 808, associative logic 810, constraints 812, expert opinion 814, etc.

Figure 9:
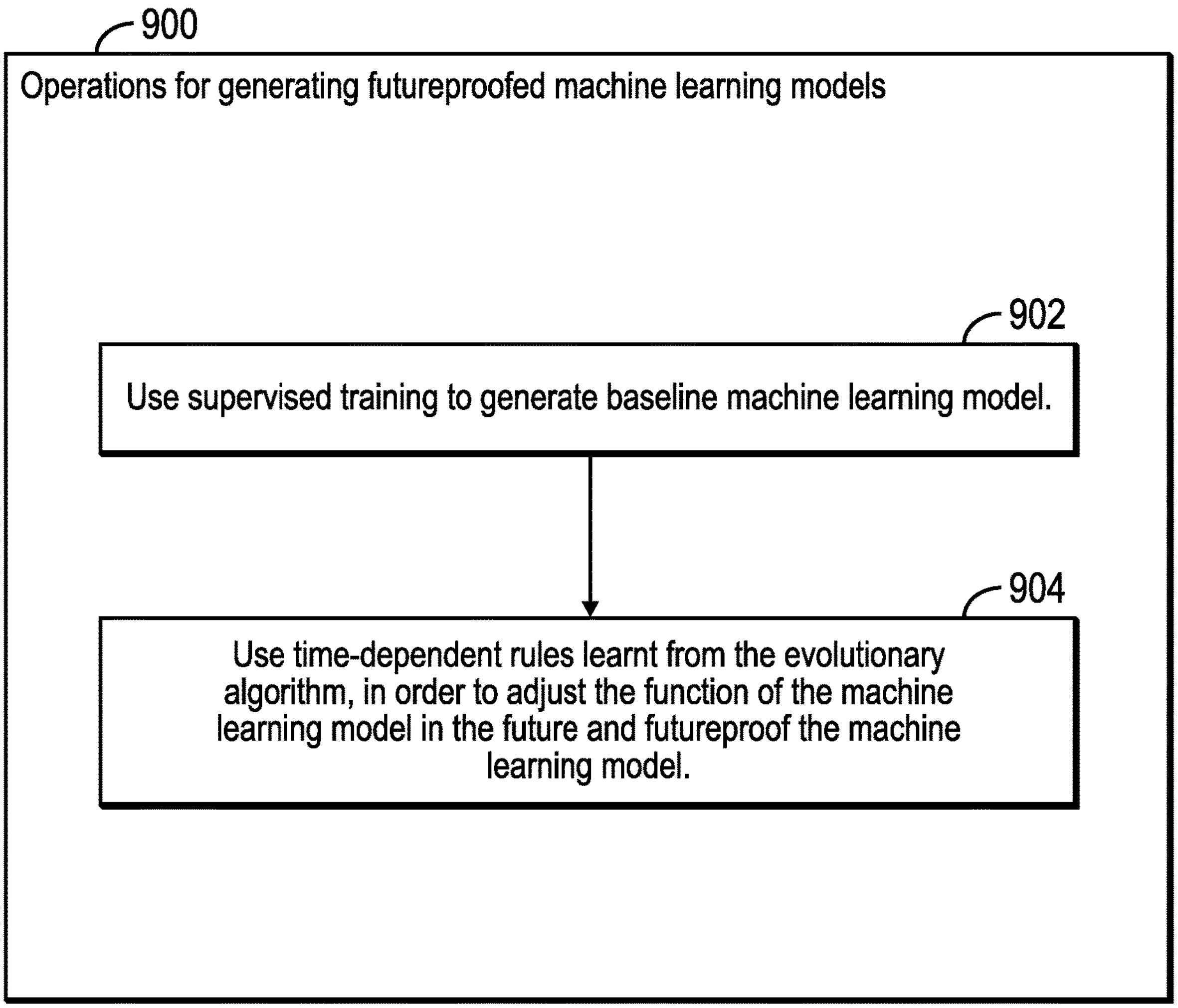
FIG. 9 illustrates a flowchart that shows operations for generating futureproofed machine learning models, in accordance with certain embodiments.

FIG. 9 illustrates a flowchart 900 that shows operations for generating futureproofed machine learning models, in accordance with certain embodiments. The operations shown in flowchart 900 may be performed by the model futureproofing application 104 that executes in the computational device 102.

Control starts at block 902 in which supervised training is used to generate the baseline machine learning model 106.

The process uses (at block 904) time-dependent rules learnt from the evolutionary algorithm, in order to adjust the function of the machine learning model in the future and futureproof the machine learning model.

Therefore, in certain embodiments the generating of the futureproofed version of the machine learning model takes place via operations that implement a time-series algorithm. An ordered set of observations with respect to time periods is a time series. In other words, a sequential organization of data according to their time of occurrence may be termed as a time series. A time series data may be the set of measurements taking place in a constant interval of time, where time acts as an independent variable and the objectives (to study changes in a characteristics) comprise dependent variables. Time series analysis is a statistical technique dealing in time series data and may be performed by a time-series algorithm in machine learning.

Figure 10:
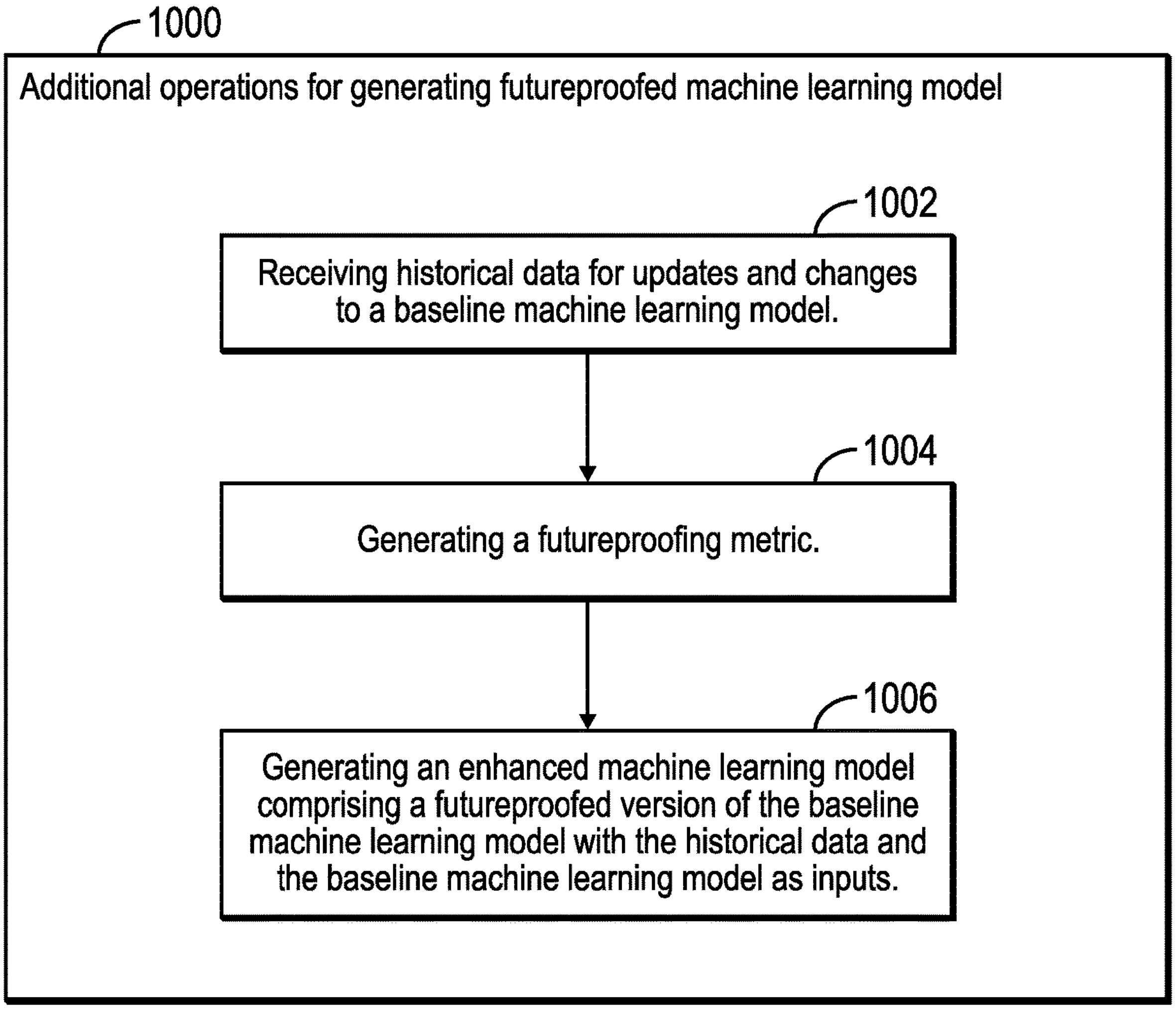
FIG. 10 illustrates a flowchart that shows additional operations for generating futureproofed machine learning models, in accordance with certain embodiments.

FIG. 10 illustrates a flowchart 1000 that shows additional operations for generating futureproofed machine learning models, in accordance with certain embodiments. The operations shown in flowchart 1000 may be performed by the model futureproofing application 104 that executes in the computational device 102.

Control starts at block 1002 in which historical data for updates and changes to a baseline machine learning model are received. A futureproofing metric is generated (at block 1004).

From block 1004 control proceeds to block 1006 in which an enhanced machine learning model 114 comprising a futureproofed version of the baseline machine learning model is generated with the historical data and the baseline machine learning model as inputs.

In additional embodiments, a future use and performance of the futureproofed version of the baseline machine learning model are captured and analyzed after deployment for a predetermined period of time, to iteratively improve at least one of: the futureproofed version of the baseline machine learning model; and operations performed for generating the futureproofed version of the baseline machine learning model. The predetermined period of time may be a limited period of time that is relatively small in comparison to the duration for which the futureproofed version of the baseline machine learning model is used in a computing environment. In yet additional embodiments, prior to receiving the historical data, in response to determining that the baseline machine learning model is not yet available for use, the baseline machine learning model is trained with suitable data.

In certain embodiments, the historical data includes past updates and past changes for related models to the machine learning model, where the past updates and the past changes for the related models have occurred prior to the baseline machine learning model being used. In further embodiments, the historical data includes training data that had been used to previously build related models to the baseline machine learning model. The related models may be based on machine learning or other paradigms.

In certain embodiments, the futureproofed version of the machine learning model is neurosymbolic and differs from the baseline machine learning model by inclusion of rules, wherein enforcement of different rules is initiated at different points in time. Neurosymbolic machine learning models may combine deep learning for feature extraction and rules-based "intuition" for manipulating those features.

In certain embodiments, the futureproofed version of the baseline machine learning model is generated while avoiding retraining of the baseline machine learning model. In other words, no retraining of an already trained baseline machine learning model is performed while generating the futureproofed version of the baseline machine learning model.

Therefore, FIGS. 1-10 illustrate certain embodiments for generating a futureproofed machine learning model.

Additional Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 11:
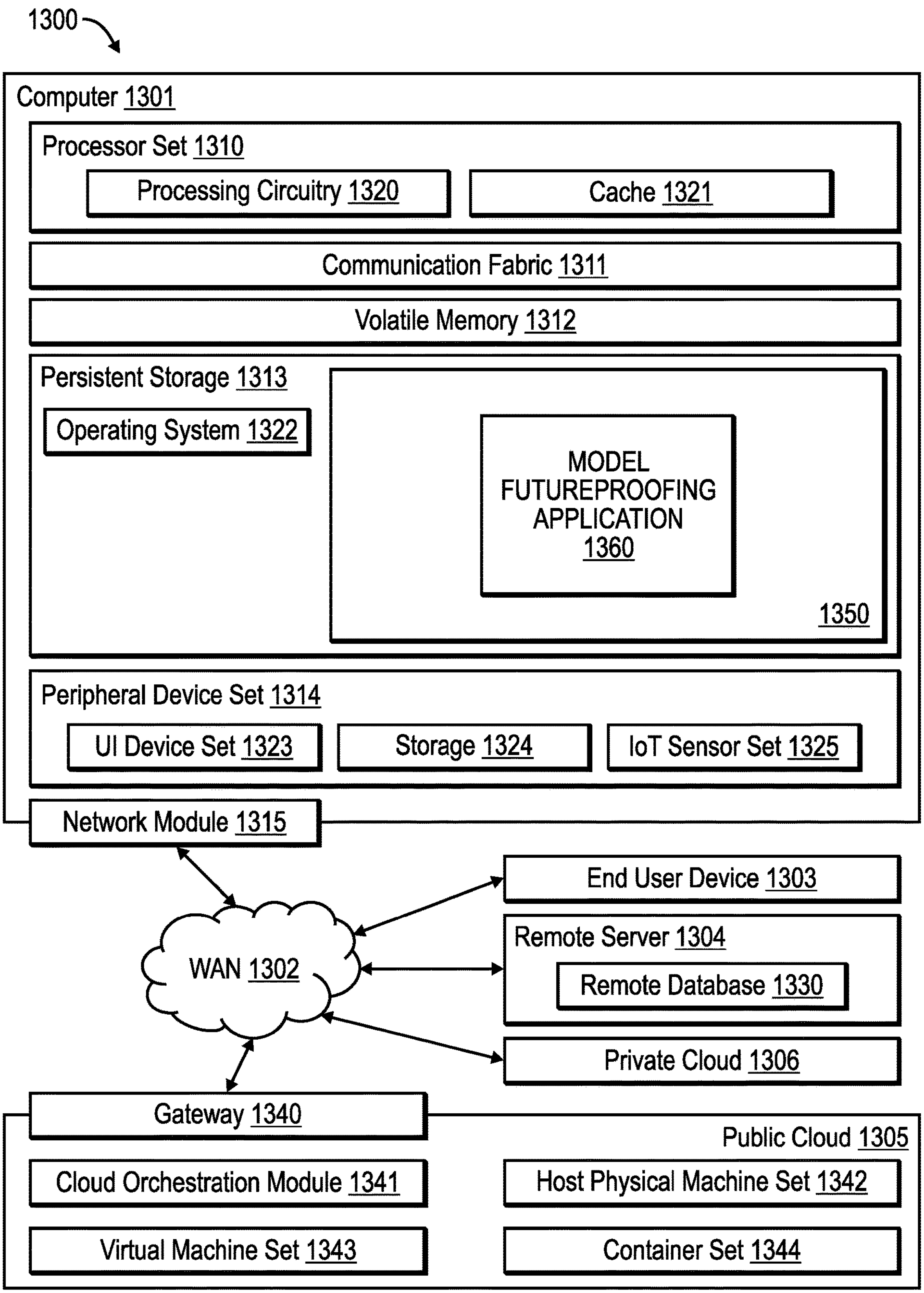
FIG. 11 illustrates a computing environment in which certain components of FIG. 1 may be implemented, in accordance with certain embodiments.

FIG. 11 illustrates block diagram in which computing environment 1300 contains an example of an environment for the execution of at least some of the computer code (block 1350) involved in performing the inventive methods, such as the model futureproofing application 1360 (The model futureproofing application 1360 of FIG. 11 is also shown via reference numeral 104 in FIG. 1).

In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1350, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 10. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 1350 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 1350 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method for futureproofing a machine learning model, the computer-implemented method comprising:

receiving, by a model futureproofing application, historical data for updates and changes to a baseline machine learning model;

generating a futureproofing metric;

generating, by the model futureproofing application, an enhanced machine learning model comprising a selected futureproofed version of the baseline machine learning model from a plurality of futureproofed versions of the baseline machine learning model, wherein the plurality of futureproofed versions of the baseline machine learning model are generated by the model futureproofing application with the historical data, objective functions that take into account future events, and the baseline machine learning model as inputs;

deploying and monitoring the enhanced machine learning model;

in response to determining that the objective functions are not met to a predetermined threshold degree, providing feedback and changing an evolutionary process for the model futureproofing application; and in response to determining that the objective functions are met to the predetermined threshold degree, determining that the enhanced machine learning model is to be continued to be used without changes.

2. The computer-implemented method of claim 1, wherein a future use and performance of the selected futureproofed version of the baseline machine learning model are captured and analyzed after deployment for a predetermined period of time, to iteratively improve at least one of:

the selected futureproofed version of the baseline machine learning model; and operations performed for generating the selected futureproofed version of the baseline machine learning model.

3. The computer-implemented method of claim 1, the computer-implemented method further comprising:

prior to receiving the historical data, in response to determining that the baseline machine learning model is not yet available for use, training the baseline machine learning model with data.

4. The computer-implemented method of claim 1, wherein the historical data includes additional updates and additional changes for related models to the baseline machine learning model that have occurred prior to the baseline machine learning model being used.

5. The computer-implemented method of claim 1, wherein the historical data includes training data that had been used to previously build related models to the baseline machine learning model.

6. The computer-implemented method of claim 1, wherein the generating of the selected futureproofed version of the baseline machine learning model takes place via operations that implement an evolutionary algorithm.

7. The computer-implemented method of claim 1, wherein the generating of the selected futureproofed version of the baseline machine learning model takes place via operations that implement a time-series algorithm.

8. The computer-implemented method of claim 1, wherein the generating of the selected futureproofed version of the baseline machine learning model is based on factors that include future concept drifts, covariate shifts, and prior probability shifts.

9. The computer-implemented method of claim 1, wherein the selected futureproofed version of the baseline machine learning model is neurosymbolic and differs from the baseline machine learning model by inclusion of rules, and wherein enforcement of different rules is initiated at different points in time.

10. The computer-implemented method of claim 1, wherein the baseline machine learning model is a supervised model.

11. The computer-implemented method of claim 1, wherein the selected futureproofed version of the baseline machine learning model is generated while avoiding retraining of the baseline machine learning model.

12. The computer-implemented method of claim 1, wherein the baseline machine learning model is extrapolated for generating the selected futureproofed version of the baseline machine learning model.

13. A system for futureproofing a machine learning model, the system comprising:

a memory; and a processor coupled to the memory, wherein the processor performs operations, the operations comprising:

receiving, by a model futureproofing application, historical data for updates and changes to a baseline machine learning model;

generating a futureproofing metric;

generating, by the model futureproofing application, an enhanced machine learning model comprising a selected futureproofed version of the baseline machine learning model from a plurality of futureproofed versions of the baseline machine learning model, wherein the plurality of futureproofed versions of the baseline machine learning model are generated by the model futureproofing application with the historical data, objective functions that take into account future events, and the baseline machine learning model as inputs;

deploying and monitoring the enhanced machine learning model;

in response to determining that the objective functions are not met to a predetermined threshold degree, providing feedback and changing an evolutionary process for the model futureproofing application; and in response to determining that the objective functions are met to the predetermined threshold degree, determining that the enhanced machine learning model is to be continued to be used without changes.

14. The system of claim 13, wherein a future use and performance of the selected futureproofed version of the baseline machine learning model are captured and analyzed after deployment for a predetermined period of time, to iteratively improve at least one of:

the selected futureproofed version of the baseline machine learning model; and selected operations performed for generating the selected futureproofed version of the baseline machine learning model.

15. The system of claim 13, the operations further comprising:

prior to receiving the historical data, in response to determining that the baseline machine learning model is not yet available for use, training the baseline machine learning model with data.

16. The system of claim 13, wherein the historical data includes additional updates and additional changes for related models to the baseline machine learning model that have occurred prior to the baseline machine learning model being used.

17. A computer program product for futureproofing a machine learning model, the computer program product comprising a computer readable storage medium having computer readable program code embodied therewith, the computer readable program code when executed by a computational device is configured to perform operations, the operations comprising:

receiving, by a model futureproofing application, historical data for updates and changes to a baseline machine learning model;

generating a futureproofing metric;

generating, by the model futureproofing application, an enhanced machine learning model comprising a selected futureproofed version of the baseline machine learning model from a plurality of futureproofed versions of the baseline machine learning model, wherein the plurality of futureproofed versions of the baseline machine learning model are generated by the model futureproofing application with the historical data, objective functions that take into account future events, and the baseline machine learning model as inputs;

deploying and monitoring the enhanced machine learning model;

in response to determining that the objective functions are not met to a predetermined threshold degree, providing feedback and changing an evolutionary process for the model futureproofing application; and in response to determining that the objective functions are met to the predetermined threshold degree, determining that the enhanced machine learning model is to be continued to be used without changes.

18. The computer program product of claim 17, wherein a future use and performance of the selected futureproofed version of the baseline machine learning model are captured and analyzed after deployment for a predetermined period of time, to iteratively improve at least one of:

the selected futureproofed version of the baseline machine learning model; and selected operations performed for generating the selected futureproofed version of the baseline machine learning model.

19. The computer program product of claim 17, the operations further comprising:

prior to receiving the historical data, in response to determining that the baseline machine learning model is not yet available for use, training the baseline machine learning model with data.

20. The computer program product of claim 17, wherein the historical data includes additional updates and additional changes for related models to the baseline machine learning model that have occurred prior to the baseline machine learning model being used.

* * * * *